United States Patent [19]

Qureshi et al.

[11] Patent Number: 4,814,236
[45] Date of Patent: Mar. 21, 1989

[54] HARDSURFACED POWER-GENERATING TURBINE COMPONENTS AND METHOD OF HARDSURFACING METAL SUBSTRATES USING A BUTTERING LAYER

[75] Inventors: Javaid I. Qureshi, Winter Springs, Fla.; Roland H. Kaufman; Michael E. Anderson, both of Winston-Salem, N.C.; William L. Spahr, Springfield, Pa.

[73] Assignee: Westinghouse Electric Corp., Pittsburgh, Pa.

[21] Appl. No.: 64,721

[22] Filed: Jun. 22, 1987

[51] Int. Cl.⁴ .............................................. B22B 15/00
[52] U.S. Cl. .................................... 428/678; 228/119; 228/208; 428/679; 428/939
[58] Field of Search ................... 228/119, 208, 263.14, 228/263.15; 219/76; 415/200, 212 R, 196; 416/241 R; 428/678, 679, 680, 685, 939; 427/34, 423, 427

[56] References Cited

U.S. PATENT DOCUMENTS

| | | | |
|---|---|---|---|
| 3,755,887 | 9/1973 | Simoundis | 29/498 |
| 3,804,602 | 4/1974 | Simoudis | 428/679 |
| 4,418,124 | 11/1983 | Jackson et al. | 428/678 |
| 4,665,996 | 5/1987 | Foroulis et al. | 175/61 |
| 4,677,034 | 6/1987 | Luthra | 428/678 |

FOREIGN PATENT DOCUMENTS 57-185990  11/1982  Japan .................................... 428/678

OTHER PUBLICATIONS

T. B. Jefferson et al., *Metals and How to Weld Them*, James F. Lincoln, Arc Welding Foundation, Cleveland, OH, Feb. 1983.

Birchfield, *Part Worn or Undersized? Metal Overlays Save the Day*, Welding Design and Fabrication, pp. 38–48, Feb. 1985.

*Primary Examiner*—Deborah Yee

[57] ABSTRACT

A laminated metal structure and a method of hardsurfacing stainless steel base metals are herein provided for resisting wear of steam turbine components at elevated temperatures. The laminated metal structure employs a buttering layer, sandwiched between the stainless steel base metal and a hardsurfacing layer. The buttering layer consists essentially of nickel or a nickel-based alloy and is selected to have a coefficient of thermal expansion which is between that of the base metal and that of the hardsurfacing material. This improved structure produces a relatively crack-free deposit that can provide greater service life for turbine components with less downtime due to repairs.

22 Claims, 1 Drawing Sheet

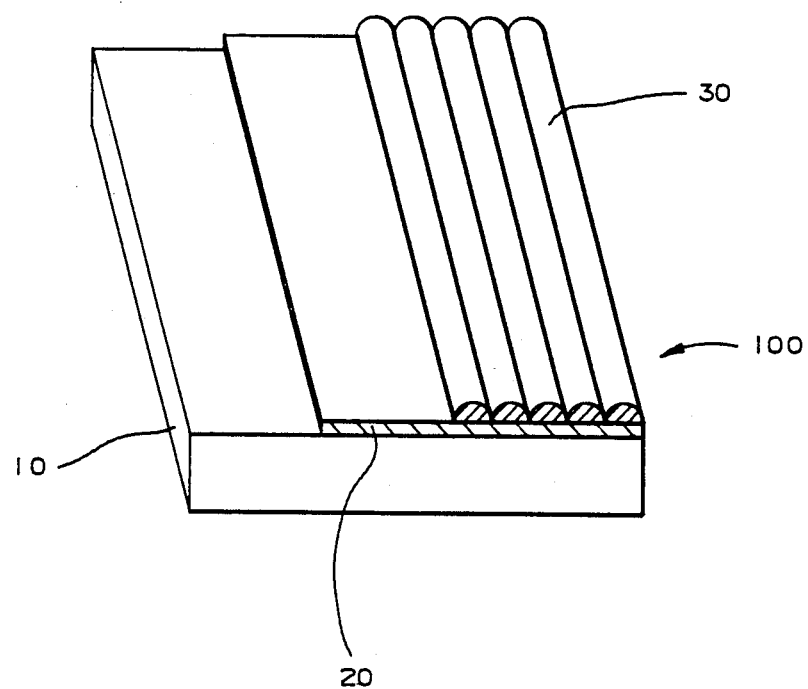

HARDSURFACED POWER-GENERATING TURBINE COMPONENTS AND METHOD OF HARDSURFACING METAL SUBSTRATES USING A BUTTERING LAYER

FIELD OF THE INVENTION

This invention relates to hardsurfacing metal substrates for high temperature service, and in particular, to hardsurfacing turbine components to minimize wear.

BACKGROUND OF THE INVENTION

Turbine components used in electrical power generation generally encounter severe wear due to a variety of mechanisms including: abrasion, erosion, fretting, corrosion, and metal-to-metal friction. Especially susceptible to this phenomenon are the keys and liners on the steam flow guides located on the upper and lower casing of a high pressure turbine. Such parts are typically manufactured from stainless steel, i.e., 12% Cr material. Since this metal is not hard in its tempered condition (15 to 25 Rockwell "C"), protective coatings such as hard facings or claddings are usually employed to prolong the life of these parts in service.

One such coating employed is STELLITE "6", which is an extremely hard material that has been a standard for hardsurfacing applications. It generally produces a surface which resists metal-to-metal wear, abrasion and impact. However, Stellite is often associated with cracking due, in part, to the differences between the coefficient of thermal expansion between the 12% Cr base metal and the welded deposit. Moreover, such cracking can also extend into the base metal, which often has been hardened intensely from the welding temperatures. This can lead to the premature failure of the component and necessitate its repair or replacement.

Replacement of these worn, fretted, or cracked components can be extremely costly. Down time alone can amount to $100,000 per day, since the electric utility often must buy electrical power elsewhere to meet consumer demands. In addition to this cost, the expenses associated with hiring a repair crew and purchasing and storing spare parts can be significant.

In an effort to reduce downtime and the consequent expense, new alloys are currently being developed to prolong the service life of turbine components. One such alloy is Tribaloy-400 from Cabot Corp of Kokomo, Ind. Tribaloy is a cobalt-based alloy and therefore retains its hardness even at elevated temperatures. See T. B. Jefferson, et al., *Metals and How to Weld Them*, James F. Lincoln Arc Welding Foundation, Cleveland, OH, February 1983, which is hereby incorporated by reference. Deposits of Tribaloy and the heat affected zone of the underlying 12% Cr stainless steel base metal, unfortunately, have developed cracks and pin holes after welding, and therefore, are not completely satisfactory.

For producing metallurgically sound weld deposits, the welding industry has traditionally relied on a "buttering" layer. Buttering has been disclosed in the trade literature as a means for applying a transition alloy to a base metal that will later be welded to a part of a different chemical composition. Birchfield, *Part Worn or Undersized? Metal Overlays Save the Day*, Welding Design and Fabrication, pp. 38-48, February 1985; which is hereby incorporated by reference. The Birchfield article reviews various processes and materials for the selection of metal overlaying. It discloses that buttering provides a metallurgical bridge between different alloys and that a buttering material must be readily weldable to the base metal and compatible with the joint filler metal that will unite the buttering part and mating part. Birchfield, also discloses the following examples: high-nickel weld metal deposited on a carbon or low-alloy steel substrate, to be welded later to a high-alloy steel base metal; a nickel-chromium-iron alloy deposited on a stainless-clad low-alloy steel before welding to stainless steel. Although teaching a use for a buttering layer, this reference fails to address the problems associated with the thermal shock and base metal cracking of turbine components. Moreover, this reference requires that the buttering layer be welded to a separate buttering part prior to attachment to a base metal mating part.

Accordingly, there is still a need for a method for hardsurfacing metal surfaces to provide turbine components having an extended useful life. There is also a need for a repair procedure that minimizes latent welding stresses and cracking of stainless steel, on power generation equipment.

SUMMARY OF THE INVENTION

A laminated metal structure and a method of hardsurfacing stainless steel base metals are provided for resisting wear, preferably at elevated temperatures. As used herein, "structure" refers to the novel combination of stainless steel base metal, nickel-containing buttering layer, and hardsurfacing layer. The novel laminated metal structure employs a buttering layer, sandwiched between a base metal and a hardsurfacing layer, which acts as buffer between these two materials. The buttering layer can be made of nickel or nickel-based alloys and is selected to have a coefficient of thermal expansion which is between that of the base metal and the hardsurfacing material. Preferably, the buttering layer comprises chromium in excess of 12% by weight so that the chromium content of the base metal is not diffused out of the base metal during the welding process. The laminated metal structure of the invention is substantially free of welding-related hot or cold cracks. This improved hardsurfacing structure is especially suited for 12% Cr turbine components used in power generation equipment. Also disclosed herein is a heat treatment procedure for relieving the welding stresses of the weld deposits and for tempering the martensite in the heat affected zone of the base metal. The combination of hardsurfacing and a buttering layer, especially with the post-weld heat treatment of this invention, will provide greater service life for turbine components with less downtime due to repairs.

It is, therefore, an object of this invention to provide a laminated metal structure and a method of hardsurfacing that minimizes the shock of thermal expansion due to welding procedures.

It is another object of this invention to provide a laminated metal structure and method of hardsurfacing turbine components that utilizes a buttering layer with a coefficient of thermal expansion intermediate to that of the base metal and the hardsurfacing material.

It is still another object of this invention to provide a laminated metal structure and method of hardsurfacing that extends the useful service life of turbine components.

It is still another object of this invention to provide a laminated metal structure and hardsurfacing procedure for turbine components that minimizes power plant downtime and spare part inventories.

It is still another object of this invention to prevent the diffusion of chromium from the base metal during the application of a hardsurfacing deposit.

With these and other objects in view, which will become apparent to one skilled in the art as the description proceeds, this invention resides in the novel construction, combination, arrangement of parts and methods substantially as hereinafter described and more particularly defined by the attached claims.

BRIEF DESCRIPTION OF THE DRAWING

The accompanying drawing illustrates a complete embodiment of the invention according to the best mode so far known for the practical application of the principles thereof, and in which the FIGURE is a perspective view illustrating the laminated structure of this invention.

DETAILED DESCRIPTION OF THE INVENTION

The present invention provides a laminated metal structure that is wear-resistant, preferably at elevated temperatures, and a method of hardsurfacing to provide the same. The procedure and structure herein described may be employed in any high temperature service application, for example, heat treating furnaces, internal combustion engines, and valve applications. However, this invention is particularly useful for turbine components, more particularly those made from 12% Cr stainless steel, which undergo heavy oxidation and scoring in steam filled chambers. The structure and method are designed to protect the relatively soft stainless steel base metal, which is often subjected to metal-to-metal friction at temperatures above about 900° F. The structure incorporates a buttering layer interposed between the base metal and hardsurfacing layer. The buttering layer is composed of nickel, nickel-based alloys, or a mixture of the two. These materials are chosen for the buttering layer because nickel and its alloys have coefficients of thermal expansion which lie between that for the stainless steel base layer and that of most hardsurfacing materials commonly used in turbine applications. The hardsurfacing layer, which is superposed on the buttering layer of this invention, preferably comprises cobalt to maintain the high temperature hardness of the laminated metal structure under power-generating service conditions.

With reference to the FIGURE, there is shown a laminated metal structure 100 which is designed for resisting wear, especially at elevated temperatures. The structure of the FIGURE can represent, for example, a section of a turbine component such as a key or liner. The structure 100 comprises a base metal 10 comprising stainless steel. Bonded to the base metal 10, is a buttering layer 20 which consists essentially of nickel, a nickel-based alloy or a mixture thereof. Superposed upon the buttering layer is a hardsurfacing layer 30 of commonly used hardsurfacing material, but which preferably comprises cobalt for improved high temperature hardness. The combination of the buttering layer 20 and the hardsurfacing layer 30 of this invention form a substantially continuous coating for protecting the base metal 10 from wear at elevated temperatures. As used herein, "coating" refers to any mechanical or metallurgical bonding of metal to the base metal 10, and includes deposits produced by cladding, welding or thermal spraying.

The base metal 10 of this invention is preferably chromium stainless steel containing about 8 to 16% chromium. Generally, this material refers to a group of stainless steels that contain no nickel. This group is frequently called "straight chromes" or martensitic stainless steels. However, the martensitic nature of the steel will greatly depend on the carbon content, a high carbon content tending to make the steel more martensitic. Such steels are generally assumed to be heat treatable and comprise the stainless steel specification numbers AISI, 403, AISI 410, AISI 414, AISI 416, AISI 418 Special, 420, 420 Se, 431, AISI 440A, AISI 440B, AISI 440C, and AISI 440Se. The basic type used in the manufacture of turbine components, i.e. keys and liners, is AISI 410 or AISI 403, each of which has a chromium content of about 12%. The materials of this series, because of their alloy balance, are capable of hardening intensely from welding temperatures, even with an air cool, and unless precautions are taken, they (and the weld materials used with them) can crack because of the high hardness developed. Preheating the steels, however, can lower thermal differences, and allowing the steel to cool slowly will reduce the cracking tendencies. It is important to the purposes of this invention that the base metal and welded structure remain as crack-free as possible to avoid failure.

Although a straight 12% Cr material such as AISI 403 or AISI 410 is preferred for use as the base material of this invention, the hardsurfacing technique is also useful on mild steel, alloyed steel, high carbon steel, and/or a combination of these. However, since the turbine power generation environment is corrosive, the preferred base metal 10 of this laminated metal structure is stainless steel, and more preferably 12% Cr stainless steel.

The buttering layer 20 of this invention in a soft material having a thermal expansion coefficient between that of the base metal and that of the hardsurfacing layer. Preferably, the buttering layer consists essentially of nickel, a nickel-based alloy, or a mixture of these. The buttering layer 20 is bonded, preferably welded, to the base metal 10. The buttering layer 20 also adds to the overall strength of the structure, since the bond between the hardsurfacing layer 30 and the base metal 10 may not be strong enough by itself to keep a multi-layer hardsurfacing deposit from pulling off. See T. B. Jefferson, et. al., *Metals and How to Weld Them*, pp. 297, 298.

The buttering layer of this invention is selected to be a relatively soft material to withstand the shock of the thermal expansion caused by the heat of the welding procedures. Nickel and its alloys are as the preferred metals for the buttering layer 20 of this invention because the coefficient of thermal expansion of these materials is in-between that of the preferred 12% Cr base metal and the preferred hardsurfacing materials. Nickel and nickel alloys are additionally preferred because of their excellent resistance to corrosion and oxidation even at high temperatures and because they permit an overlay of the preferred hardsurfacing materials without significant cracking. Additionally, the buttering layer 20 should also contain above about 12% chromium by weight. This prevents the diffusion of chromium from the 12% Cr stainless steel into the weld deposit during welding and preserves the corrosion resistance of the base metal 10.

One important alloy that can be used for this purpose is Monel, which is 67% nickel, 28% copper and 5% manganese and silicon combined. Monel is especially valuable where the turbine components are subject to wear and corrosion. Also useful are the heat-hardened variations of Monel such as, K Monel, H Monel, S Monel, R Monel and N Monel. The most preferred material for the buttering layer 20 is Inconel which is a nickel-chromium alloy. Of particular interest to the purposes of this invention, is the material Inconel-82, ASME SF 5.14, class ERNICR-3, which material exhibits the following composition by weight percent: C (0.1); Mn (2.5–3.5); Fe (3.0); P max (0.03); S max (0.05); Si (0.5); Cu max (0.5); Ni min (67.0); Co max (0.1); columbium and tantalum (2.0–3.0); Ti max (0.75); tantalum (0.3); and Cr (18.0–22.0). The buttering layer 20 generally has a thickness of about 0.25 mm to 5.0 mm, more preferably about 2 mm. This thickness can be attained by machining the layer after bonding to the base metal.

The material selected for the hardsurfacing layer 30 should have a Rockwell hardness reading significantly higher than that for the base metal, preferably in the range of 30–55 $R_c$. In general, the choice of hardsurfacing materials can be made on the basis of service requirements and the nature of wear and other conditions that are expected. Typical hardsurfacing alloys useful for this invention include chromium carbide, tungsten carbide, high-carbon chromium alloy, austenitic manganese, austenitic stainless steel (chromium-nickel types), high-speed tool steels, air or oil hardening tool steels, medium carbon and alloy steels, cobalt-based hardsurfacing materials and nickel-based hardsurfacing alloys. The hardsurfacing alloys of this invention preferably comprise cobalt to impart to the finished turbine component high hardness at elevated temperatures. The most preferred materials are Tribaloy-400 and Stellite-6, the former being selected as a preferred material for stationary turbine components and the latter being preferred for moving turbine components. While Stellite-6 is conventional, Tribaloy-400 is a relatively new alloy consisting essentially of 0.02 weight %C; 2.6 weight %Si; 8.5 weight %Cr; 28.5 weight %Mo.; 3.0 weight %Ni & Fe; and the balance being Co. These materials have been selected for example only, and those skilled in the art may find various alloy substitutions exhibiting similar properties. The hardsurfacing layer of this invention preferably has a thickness of about 1.27 to 6.35 mm, and more preferably about 4.57 mm.

The buttering layer 20 and hardsurfacing layer 30 can be bonded to or disposed on the base metal 10 by any mechanical, metallurgical, or chemical means known to those in the metal-working industry. Preferably, the buttering layer 20 is weld deposited to the base metal layer and the hardsurfacing layer 30, in turn, is weld deposited to the buttering layer. Typical coating processes that can be employed for this purpose include: Thermal Spraying, Plasma Transferred-Arc, Shielded Metal Arc, MIG, or TIG procedures. The most preferred welding process for the purposes of this invention is TIG (Tungsten-Inert-Gas). Below, is a detailed summary of the preferred basic parameters for applying the preferred buttering layer 20, Inconel-82, and the preferred hardsurfacing layer, Tribaloy-400, using a TIG welding process:

| BASIC PARAMETERS | | |
| --- | --- | --- |
| | INCONEL-82 | TRIBALOY-400 |
| AMPS | 150–180 | 200–225 |
| VOLTS | 20–25 | 25–30 |
| GAS FLOW | 15 CFM | 15 CFM |
| FILLER WIRE DIAMETER | 3/32" | 3/16" |
| SHIELDING GAS | Argon 99.8% | Argon 99.8% |
| ELECTRODE - TUNGSTEN | 2% thor. | 2% thor. |

In a preferred method of this invention, Inconel-82 is welded to the base metal, using the above procedure, to provide a buttering layer thickness of about 2.54 mm. The buttering layer is preferably machined to a thickness of about 2.03 mm. The resultant intermediate composite, which comprises the base metal and buttering layer, is then heated to a temperature of about 232° C. to 482° C., preferably about 400° C., prior to and during the welding of the hardsurfacing layer 30 onto buttering layer 20. As used herein, the temperature of the substrate during the welding of the hardsurfacing layer 30 is referred to as the "interpass temperature".

Preheating is useful to (1) minimize the possibility of thermal shock damage to the stainless steel as the welding arc is applied; (2) slow the cooling to prevent the formation of excessively large fusion zones; (3) prevent excessive hardness in the weld itself; and (4) equalize the cooling of the weld and the base metal, thereby minimizing the possibility of shrinkage cracks. See T. B. Jefferson, et. al., *Metals and How to Weld Them*, p. 332.

After depositing the hardsurfacing material, the laminated metal structure is preferably tempered with a post-weld heat treatment. When the base metal 10 is the preferred 12% Cr stainless steel, the temperature selected for the post-weld heat treatment should be high enough to temper martensite formations in this base metal. The preferred heat treatment schedule comprises heating the welded structure for a time that is sufficient to relieve at least the maximum stresses caused by the various bonding steps of the method of this invention. A preferred heat treatment range for this invention is about 593° C. to 627° C.

The laminated metal structure 100 resulting from the bonding operation, as described, is generally at a temperature of about 232°–482° C. The structure can be permitted to cool in an insulating atmosphere, or maintained at about its interpass temperature prior to insertion into a heat-treating oven. The laminated metal structure 100 is then heated at about 30°–40° C. per hour, preferably about 38° C./hour, until it obtains a uniform temperature of about 593° C. to 627° C. The structure 100 is then held at that temperature for about 1 to 3 hours. Preferably, the structure is held at the optimum temperature for one hour per inch of thickness of the component, with one hour being the minimum holding time for pieces under one inch in thickness. After heat treatment, the component is preferably allowed to cool at a rate below about 38° C. per hour. This can be accomplished by cooling in an insulating environment, i.e. Vermiculite, Kaowool or a slow furnace rate cooling. This cooling step is continued at least until the laminated metal structure 100 obtains a uniform temperature of about 149° C., at which point the cooling rate is less important and the structure can be exposed to ambient temperatures. It must be noted that this heat treatment schedule is for illustrative purposes only, and those skilled in the art may find alternative heat treatment schedules that will provide sufficient tempering for both the weldment and the heat-affected zone of the base metal.

In summary, this invention provides a laminated metal structure 100 exhibiting fewer imperfections, while at the same time, maintaining resistance to wear from room temperature to elevated temperatures. The preferred combination of Inconel-82 and Tribaloy-400 produces a surface having a Rockwell "C" hardness reading of about 40–50. The Inconel-82 buttering layer possesses a coefficient of thermal expansion intermediate to that of the base metal and the preferred hard surfacing material, Tribaloy-400. Inconel-82 also consists of 18.0 to 22.0 weight percent Cr which permits the deposition of this alloy with minimal dillution of the chromium content of the stainless steel base metal. Finally, the structure of this invention is readily fabricated using existing welding procedures and provides for longer lasting turbine components.

This structure and method are particularly useful in minimizing cracking and the service life of stainless steel keys and liners located on the flow guides of steam turbine systems. These components can be coated with a nickel-containing, buttering layer, of the kind described above, then hardsurfaced. Accordingly, the elevated temperature turbine system, thus protected, can be operated with less donwtime due to replacement of these critical parts.

From the foregoing, it can be realized that this invention provides an improved laminated metal structure and method for resisting wear or elevated temperatures. The laminated metal structure utilizes a novel buttering layer which provides a buffer and limits the thermal shock caused by the welding processes. Accordingly, this invention provides a sounder hardsurfacing weldment and specifically, a more economical TRIBALOY application procedure without a high rejection rate due to cracking of weld deposits. Although various embodiments have been illustrated, this was for the purpose of describing, not limiting the invention. Various modifications, which will become apparent to one skilled in the art, are within the scope of this invention.

We claim:

1. A laminated metal structure for resisting wear at elevated temperatures comprising:
   (a) a base metal comprising stainless steel, said base metal having about 8 to 16 weight percent chromium therein;
   (b) a buttering layer comprising chromium and nickel, said buttering layer welded to said base metal; and
   (c) a hardsurfacing layer having a macro-hardness of at least about $30R_c$ welded to said buttering layer, said hardsurfacing layer consisting essentially of about 0.02 weight percent C, 2.6 weight percent Si, 8.5 weight percent Cr, 28.5 weight percent Mo, 3.0 weight percent Ni and Fe, and the balance being Co, said combination of said buttering layer and said hardsurfacing layer forming a coating substantially free of welding-induced cracks for protecting said base metal from wear at elevated temperatures.

2. The structure of claim 1 wherein said base metal comprises 12 weight % chromium.

3. The structure of claim 1 wherein said buttering layer comprises at least about 12% chromium by weight.

4. The structure of claim 1 wherein said buttering layer has a thickness of about 0.25 to 5 mm.

5. The structure of claim 4 wherein said hardsurfacing layer has a thickness of about 1.27 to 6.35 mm.

6. A method of hardsurfacing stainless steel base metals for resisting wear at elevated temperatures, comprising:
   (a) providing a stainless steel metal;
   (b) welding a buttering layer to said base metal, said buttering layer being selected from a group consisting of nickel, nickel-based alloys, and a mixture thereof;
   (c) heating said base metal and said buttering layer to about 230° C. to 482° C.; and
   (d) welding a hardsurfacing layer having a macro-hardness of at least about $30R_c$ on said buttering layer to form a coating substantially free of welding-induced cracks for protecting said base metal from wear at elevated temperatures.

7. The method of claim 6 wherein said base metal is selected to comprise 8–16 weight % chromium.

8. The method of claim 6 wherein said base metal is selected to comprise 12 weight % chromium.

9. The method of claim 6 wherein said buttering layer is selected to further comprise chromium.

10. The method of claim 6 wherein said hardsurfacing layer is selected to comprise cobalt.

11. A method of hardsurfacing stainless steel base metals for resisting wear at elevated temperatures comprising:
    (a) providing a stainless steel metal;
    (b) welding a buttering layer to said base metal, said buttering layer being selected from the group consisting of nickel, nickel-based alloys, and a mixture thereof; and
    (c) welding a hardsurfacing layer on said buttering layer to form a substantially continuous coating for protecting said base metal from wear at elevated temperatures, said hardsurfacing layer consisting essentially of 0.02 weight percent C, 2.6 weight percent Si, 8.5 weight percent Cr, 28.5 weight percent Mo, 3.0 weight percent Ni and Fe, and the balance being Co.

12. The method of claim 6 wherein said buttering layer is provided in a thickness of about 0.25 to 5 mm.

13. The method of claim 6 wherein said hardsurfacing layer is provided in a thickness of about 1.27 to 6.35 mm.

14. The method of claim 6 wherein said base metal and said buttering layer are pre-heated to about 400° C. prior to welding the hardsurfacing layer.

15. The method of claim 6 wherein said base metal and said buttering layer are kept at an interpass temperature of about 232° C. to 482° C. at least during disposing step (c).

16. The method claim 6 wherein said base metal and said buttering layer are kept at an interpass temperature of about 400° C.

17. A method of hardsurfacing stainless steel base metals for resisting wear at elevated temperatures, comprising:
    (a) providing a stainless steel metal;
    (b) welding a buttering layer to said base metal, said buttering layer being selected from a group consisting of nickel, nickel-based alloys, and a mixture thereof;
    (c) welding a hardsurfacing layer having a macro-hardness of at least about $30R_c$ on said buttering layer to form a coating substantially free of welding-induced cracks for protecting said base metal from wear at elevated temperatures; and (d) heating said base metal and coating for a time that is sufficient to relieve at least a portion of the stress caused by welding steps (b) and (c).

18. The method of claim 17 wherein said heating step comprises heating said structure to about 593° C. to 627° C.

19. The method of claim 18 further comprising the step of heating said base metal and coating for about 1 to 3 hours.

20. The method of claim 19 further comprising the step of cooling said coating at a rate less than about 38° C. per hour.

21. The method of claim 20 wherein said cooling step cools said base metal and coating until a uniform temperature of about 149° C. is reached.

22. The method of claim 20 wherein said cooling step comprises cooling in an insulating environment.

* * * * *